United States Patent
Wohead

[15] 3,670,447
[45] June 20, 1972

[54] NON-SNAGGING FISHING DEVICE

[72] Inventor: Michael J. Wohead, R. R. 2, Box 12, Naperville, Ill. 60540

[22] Filed: May 18, 1970

[21] Appl. No.: 38,314

[52] U.S. Cl..........................................43/43.14, 43/44.97
[51] Int. Cl. .........................................A01k 95/00
[58] Field of Search.....................................43/43.14, 44.97

[56] References Cited

UNITED STATES PATENTS

| | | | |
|---|---|---|---|
| 3,084,471 | 4/1963 | Alspaugh | 43/43.14 X |
| 3,010,244 | 11/1961 | Mattingly | 43/43.14 X |

FOREIGN PATENTS OR APPLICATIONS

| | | | |
|---|---|---|---|
| 20,443 | 1891 | Great Britain | 43/43.14 |
| 715,795 | 9/1931 | France | 43/43.14 |

Primary Examiner—Samuel Koren
Assistant Examiner—Daniel J. Leach
Attorney—Hill, Sherman, Meroni, Gross & Simpson

[57] ABSTRACT

A non-snagging fishing device for use as a sinker for a fishing line characterized by an elongated tubular body having a flotation portion adjacent one end and the weight concentrated adjacent the other end so that it assumes a substantially upright position in the water. The device is preferably provided with a chamber adjacent the weighted end to receive additional weight to increase the weight of the device. In one embodiment, the body portion is provided by a pair of plastic tubular sections interconnected by a coupling device to enable breakdown for storage and transportation.

5 Claims, 4 Drawing Figures

PATENTED JUN 20 1972
3,670,447
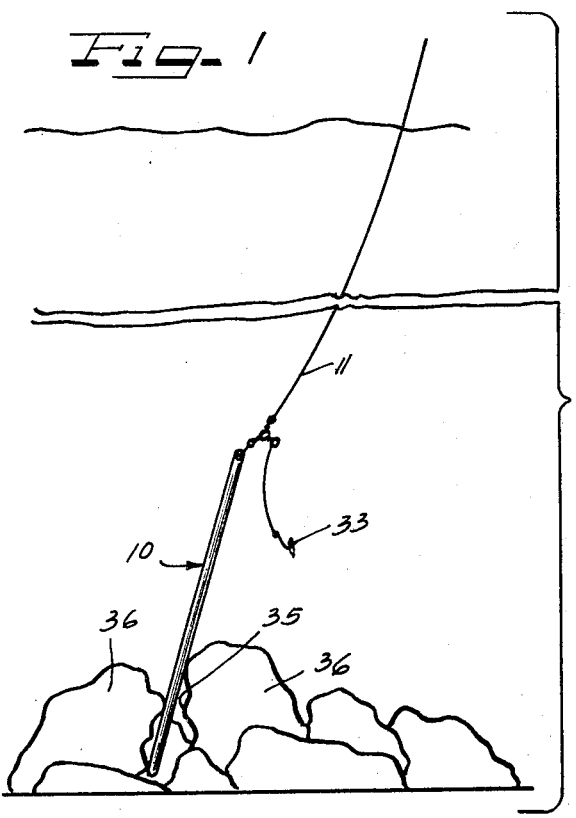
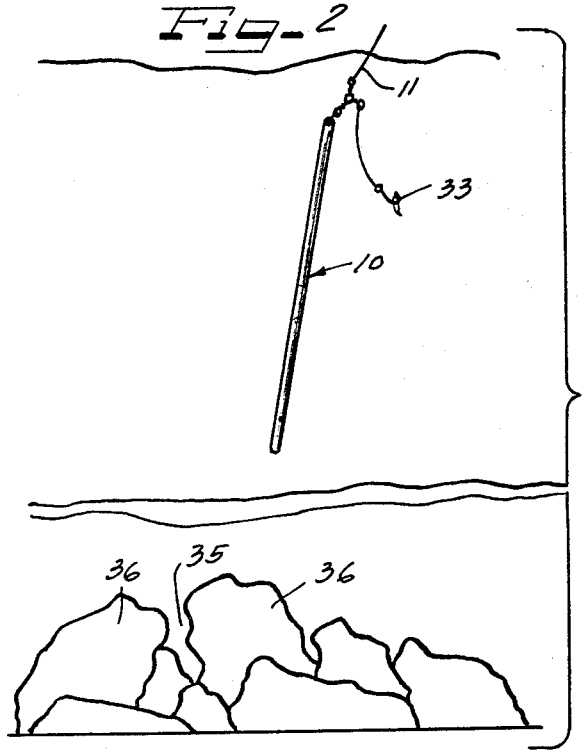
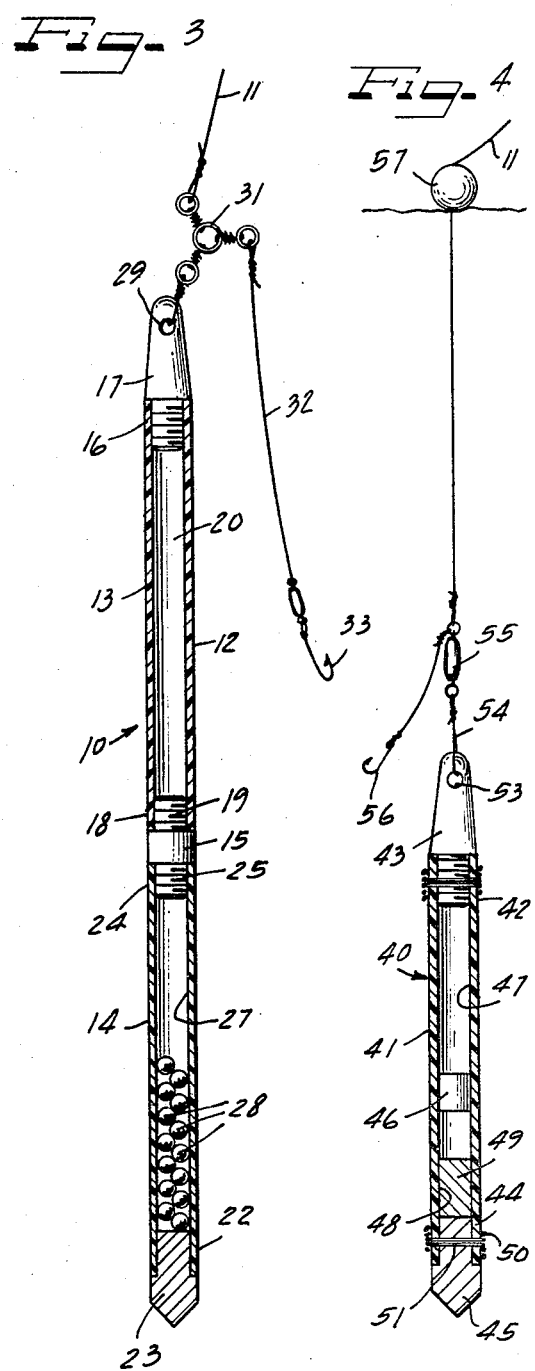
INVENTOR.
MICHAEL J. WOHEAD
BY Hill, Sherman, Meroni, Gross & Simpson
ATTORNEYS

NON-SNAGGING FISHING DEVICE

BACKGROUND OF THE INVENTION

1. Field of the Invention

The present invention is directed to a fishing device for use as a sinker for a fishing line.

2. Prior Art

Presently known sinkers for fishing lines comprise a mass of heavy metal such as lead which is attached to the fishing line. When using such a sinker in a body of water having a rocky bottom or other obstructions, the weight as it sinks to the bottom and is later retrieved becomes snagged resulting in the loss of fishing equipment or time used to get the sinker unsnagged. Even if the line is cast so that the sinker falls in an area free of obstructions, it may be snagged on objects such as rocks or vegetation as it is being retrieved. For an example when fishing from a breakwater formed from rocks, the sinker usually bounces along the bottom as it is being retrieved and will become snagged in the rocks forming the breakwater. When fishing in a stream or river, the sinker is often moved downstream by the current and becomes snagged in obstructions in its path.

Fishing in streams or rivers presents another problem with sinkers. If the current is strong, additional weight is required to prevent movement of the fishing line with the current. Various methods are available to prevent the movement of fishing line and hook by the current. These methods include using a larger sinker or a plurality of sinkers. Another method is to use a sinker whose weight is adjustable. Examples of different types of structure of sinkers which can have their weight adjusted are disclosed in the U.S. patents to Hoard, U.S. Pat. No. 12,060; to Kale, U.S. Pat. No. 1,858,550; and to Klein, U.S. Pat. No. 2,600,002. The sinkers disclosed in these patents have a chamber to receive additional weight elements such as lead shot to vary the sinking and floating characteristics of the device. In the U.S. Pat. to Foster, U.S. Pat. No. 3,012,359, a device which can be used as either a float or a sinker depending on the change of the size of an air chamber is disclosed. However, each of these devices disclosed in the above-mentioned patents will become snagged on rocks or obstructions for the same reasons that an ordinary lead sinker becomes snagged.

SUMMARY OF THE INVENTION

The present invention is directed to a fishing device for use as a sinker which is retrievable after sinking to the bottom of a body of water without snagging on obstructions disposed on the bottom or on obstructions in the path of retrieval. The device has an elongated and flexible body with the weight concentrated at one end, means for attaching the body to a fishing line at the other end and a buoyant portion adjacent the means for attaching so that the device assumes a substantially upright position when disposed in the body of water. In the preferred embodiments, a chamber for receiving additional weight elements is provided in the body adjacent to the weighted end. In one embodiment, a weight mounted at the one end is detachable to enable changing of its size and to give access to a chamber for receiving the additional weight elements. Another embodiment utilizes a pair of sections joined by a coupling means to form the elongated body portion, which coupling means enables both the breakdown of the device for easy storage and transportation and the access to a chamber holding removable weight elements.

BRIEF DESCRIPTION OF THE DRAWINGS

FIG. 1 illustrates the device of the present invention adjusted to sink to the bottom of a body of water;

FIG. 2 illustrates the device of the present invention with its weight adjusted to float adjacent the surface of the body of water.

FIG. 3 is an enlarged cross-section with portions in elevation for purposes of illustration of an embodiment of the present invention; and FIG. 4 is an enlarged cross section of another embodiment of the device of the present invention.

DESCRIPTION OF THE PREFERRED EMBODIMENTS

The principles of the present invention are particularly useful when incorporated in a non-snagging fishing device generally indicated at 10 in FIG. 3, which device is used as a sinker for a fishing line 11. The device 10 has an elongated body portion 12 which is formed of a pair of hollow sections 13 and 14, which are preferably plastic tubes, interconnected by a coupling means 15.

The section 13 has one end 16 closed by a plug 17 and the other end 18 closed by a plug portion 19 of the coupling means 15. The plugs 17 and 19 seal the section 13 to form an airtight chamber 20 which is a buoyant portion of the device 10. If necessary, sealing materials such as a resin can be utilized with the plugs 17 and 19 to insure the airtight seal of the chamber 20.

The section 14 has mounted at one end 22 a weight member 23 which is telescopically received in the end 22 to close the tubular member forming the section 14. The other end 24 of the section 14 coacts with a projection 25 of the coupling 15 to interconnect the section 14 to the coupling means 15 and the first mentioned section 13. As illustrated, the projection 25 is provided with threads which coact with threads provided at the end 24 for making the detachable connection. Another means of forming the detachable connection is by providing aligned openings in the end 24 which are aligned with a passageway in the projection 25 and passing a wire through the openings and passageway to form the connection of the section 14 to the coupling 15. By closing the end 22 with the weight 23 and the end 24 by the coupling plug 25, section 14 is provided with a chamber 27 for receiving additional weight elements, such as lead shot 28, to increase the weight of the device 10 to change its sinking and floating characteristics.

To attach the device 10 to the fishing line 11, an aperture 29 is provided in the plug 17 to form an attaching means which is illustrated as being connected to an eye of a swivel device 31. The swivel device 31 has three eyes with one of the other two eyes being connected to the fishing line 11 and the second eye being connected to a fishing line 32 which supports a catching device which is illustrated as a hook 33.

As illustrated, the weight of the device is concentrated adjacent the end 22 and coacts with the floating characteristics of the buoyant chamber 20 to cause the device 10 to assume a substantially vertical or upright position in a body of water. If additional weights have been added to the chamber 27 to overcome the positive buoyancy of the buoyant chamber, the device will sink to the bottom as illustrated in FIG. 1. However, in sinking to the bottom it will sink in a substantially upright position. Thus, if the device 10 falls into a crevice 35 formed by obstructions such as rocks 36, it can be easily retrieved when desired. By applying a force to the fishing line 11, the device will slip out of the crevice 35. Due to the flexible nature of the plastic sections 13 and 14, the device 10 will bend if necessary to aid the removal from the crevice.

If the device is used in a stream, and if the current is carrying it along the bottom, it will move along the bottom while still being maintained by the buoyancy of the buoyant portion 20 in a substantially upright position and will pass over rocks or obstructions on the bottom without snagging. During retrieving of the device, the substantially upright position causes it to pass over obstructions in a similar manner. During retrieving at a high speed, the device 10, whether it is used for bottom fishing as illustrated in FIG. 1 or for surface fishing as illustrated in FIG. 2, will tend to move upward toward the surface allowing it to skim over any obstructions on the bottom of the body of water. Thus, while fishing from a rocky breakwater, the device 10 is retrievable over the rocks of the breakwater without becoming snagged.

If the device 10 is to be used while fishing near the surface (FIG. 2), the number of weight elements 28 in the chamber 27 are adjusted so that the device 10 floats near the surface. By changing the weight element 28 in chamber 27, the device 10 can be adjustable for fishing on the bottom or near the surface.

Another embodiment of the non-snagging fishing device is generally indicated at 40 in FIG. 4. The device 40 has a portion 41 formed of a plastic tubular member having one end 42 closed by a plug 43. The other end 44 of the tubular body 41 is closed by a weight member 45 which is preferably detachably mounted in the end 44. To form a buoyant portion, another plug 46 is inserted in the tubular body 41 and is spaced inwardly from the weight member 45. The plugs 46 and 43 define an air chamber 47 of the buoyant portion. A space between the plug 46 and the detachable weight member 45 forms a second chamber 48 for receiving additional weight elements such as lead cylinders 49. As mentioned above, the weight member 45 is detachably connected to the end 44 and the connection can be made by threads or, as illustrated, is formed by means of a wire 50 passed through openings in tubular wall at the end 44 and a passageway 51 in the weight portion 45. It has been found that to prevent splitting of the wall of the tubular member 41, it is advisable to wrap the wire tightly around the outer surface to provide additional reinforcement.

The detachable weight member 45 enables entrance to the chamber 48 for inserting and removing the weight elements 49. It is also possible to replace the detachable weight elements 45 with a heavier weight member, if desired.

The plug 43 has an aperture 53 for receiving a line such as 54 of the fishing device. The line 54 can go to a swivel device such as 31 illustrated in FIG. 3. As illustrated in FIG. 4, the line 54 is connected to a swivel 55 on which a hook 56 is connected by a short line and the swivel 55 is connected by a line to a float 57 which would indicate when a fish is biting or has been hooked.

As mentioned above, the sections 13 and 14 of the body portion 11 are made of a plastic tubing. The plastic tubing can have a diameter of approximately three-eights to one-half inch and be of any desired length. In selecting the length for the non-snagging fishing device 10 or 40, the average size of the obstruction should be taken into consideration. The major requirement is that the length of the non-snagging device be greater than the size of the rocks, as illustrated in FIG. 1. The embodiment of a single tubular member (FIG. 4) preferably has a length of approximately 18 inches. If the obstructions on the bottom are large and require a greater length for the device, the two-section embodiment of FIG. 2 is preferred since the coupling means 15 enables its disassembly into smaller lengths for storage and transportion. For example, the device 10 can have a length of approximately three feet and be disassembled into two sections of about 18 inches in length.

Although minor modifications might be suggested by those versed in the art, it should be understood that I wish to employ within the scope of the patent warranted herein all such modifications as reasonably and properly come within the scope of my contribution to the art.

I claim:

1. A non-snagging fishing device for use as a sinker with a fishing line comprising an elongated and flexible body portion having a thin cross section and a smooth outer surface, said body portion being formed by a tube having both ends closed with one end being closed by a weight mounted in said end and the other end being closed by means for attaching the device to a fishing line, said body portion having a plug disposed in said tube in spaced relation to said means for attaching to separate the interior of the body portion into a sealed air chamber forming a buoyant portion adjacent the means for attaching and a second chamber adjacent to the weight for receiving additional weight elements so that the weight of the device is concentrated adjacent said one end to cause said device to assume a position in a body of water with said one end lower than the other end so that even if the device sinks to the bottom of the body of water, it can be retrieved without snagging on obstructions on the bottom and in the path of retrieval.

2. A non-snagging fishing device according to claim 1, wherein the weight mounted in the one end of the tube is detachably mounted therein, to enable changes in the size of the weight and to enable access to said second chamber.

3. A non-snagging fishing device according to claim 1, wherein said means for attaching comprises a plug sealed in said other end of the tube.

4. A non-snagging fishing device according to claim 1, wherein said tube forming said body portion comprises two sections with the first section being closed and sealed by said plug and by said means for attaching to provide the sealed air chamber, and the second section being connected to the first section by coupling means provided on said plug and an end of the second section.

5. A non-snagging fishing device according to claim 4, wherein said coupling means enables access to the interior of the second tube section to enable changing of the weight contained in said second chamber to adjust the total weight of the device to vary the sinking and floating characteristic thereof.

* * * * *